Jan. 3, 1967 F. SCHLOSS 3,296,528
AUTOMATIC RECORDING PHASE AND RATIO METER
Filed Feb. 26, 1964 6 Sheets-Sheet 1

INVENTOR.
FRED SCHLOSS
BY
ATTYS.

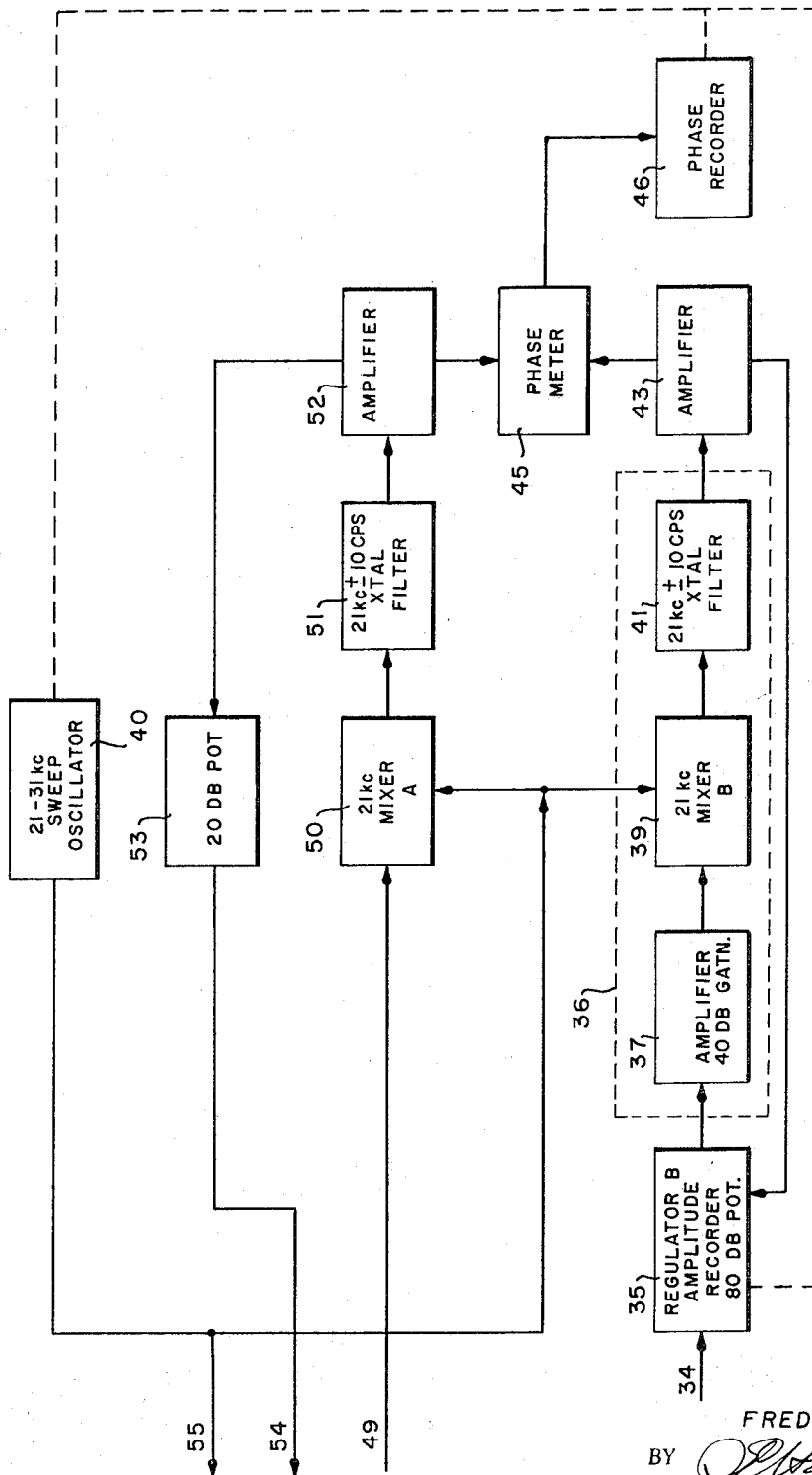

Jan. 3, 1967 F. SCHLOSS 3,296,528
AUTOMATIC RECORDING PHASE AND RATIO METER
Filed Feb. 26, 1964 6 Sheets-Sheet 4

INVENTOR.
FRED SCHLOSS
BY
ATTYS.

INVENTOR.
FRED SCHLOSS

United States Patent Office 3,296,528
Patented Jan. 3, 1967

3,296,528
AUTOMATIC RECORDING PHASE AND RATIO METER
Fred Schloss, Arlington County, Va., assignor to the United States of America as represented by the Secretary of the Navy
Filed Feb. 26, 1964, Ser. No. 347,621
16 Claims. (Cl. 324—83)

The invention described herein may be manufactured and used by or for the Government of the United States of America for governmental purposes without the payment of any royalties thereon or therefor.

The invention relates to a phase measuring system and more particularly to an accurate phase measuring system for accommodating input voltages of vastly different amplitudes.

The prior art phase meters generally operate satisfactorily when the voltages to be compared are of the same order of magnitude. However, when the amplitude of the signals to be compared are vastly different then the prior art phase meters introduce different phase shifts in each of the signal. Generally, the larger the amplitude of the signal, the greater the phase shift error generated in the particular phase comparison circuit the signal traverses.

An object of the present invention is to provide a recording phase meter for systems having very large swing in signal amplitudes.

A further object of the invention is to provide an analytic phase meter for comparing the phase relationships of the frequency components of a pair of signals.

Another object of the invention is to provide a phase comparing apparatus containing means for eliminating phase shift errors caused by variations in the amplitude of signals to be compared which are inparted in the phase comparing apparatus comparing the signals.

Still another object of the invention is to provide phase comparing apparatus for comparing the phase relationship of a pair of unknown signals as well as the phase relationship of a known and an unknown signal.

Still another object of the invention is the use of a analytical phase meter as an automatic impedance plotter.

Other objects and many of the attendant advantages of this invention will be readily appreciated as the same becomes better understood by reference to the following detailed description when considered in connection with the accompanying drawings wherein:

FIGS. 1a and 1b taken together is a block diagram of an analytical phase meter in accordance with the invention for automatic plotting of mechanical impedance;

FIGS. 2a and 2b taken together is a block diagram of an alternate embodiment of an analytical phase meter in accordance with the invention;

Figure 1A:
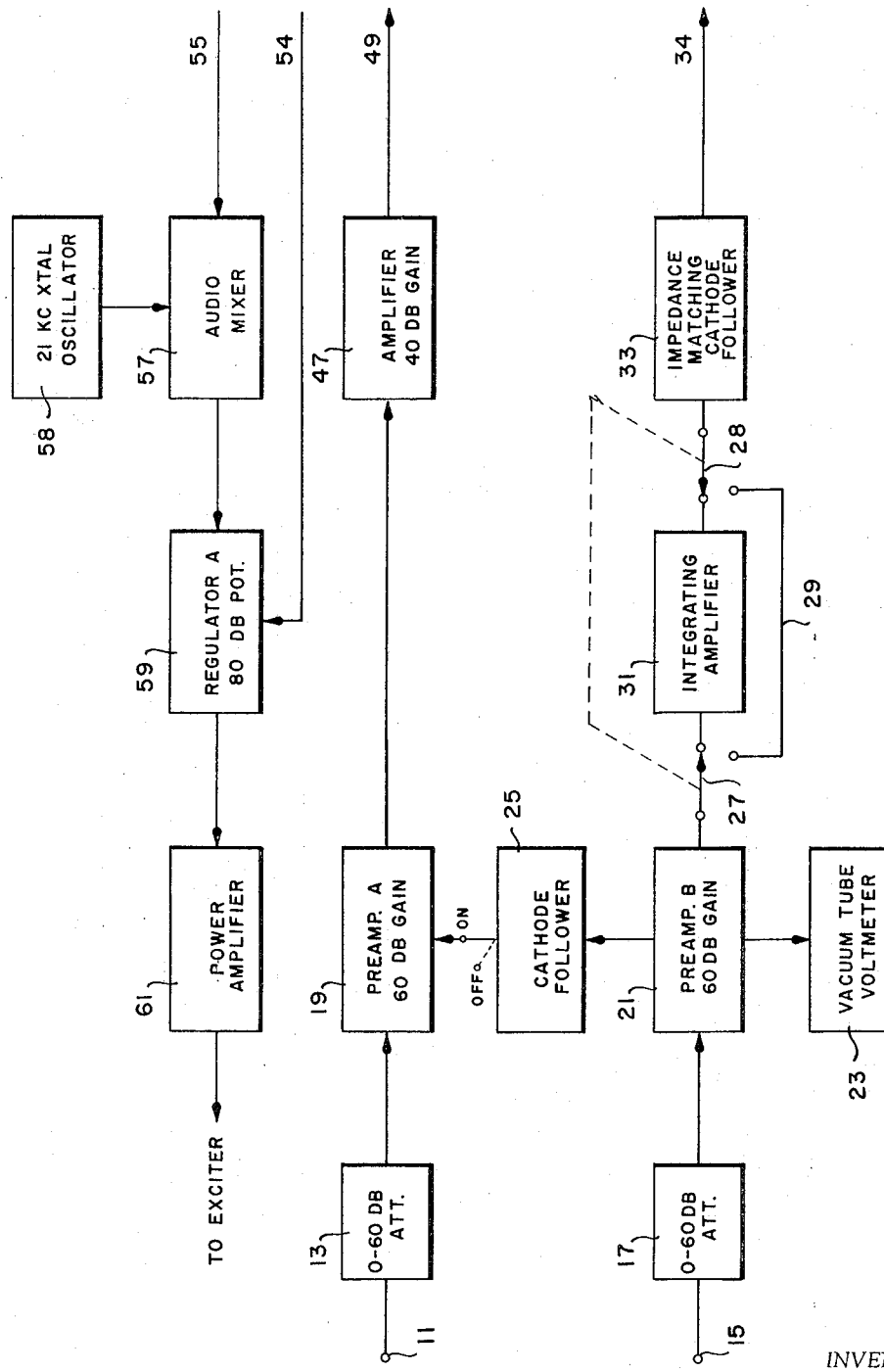
Figure 5:
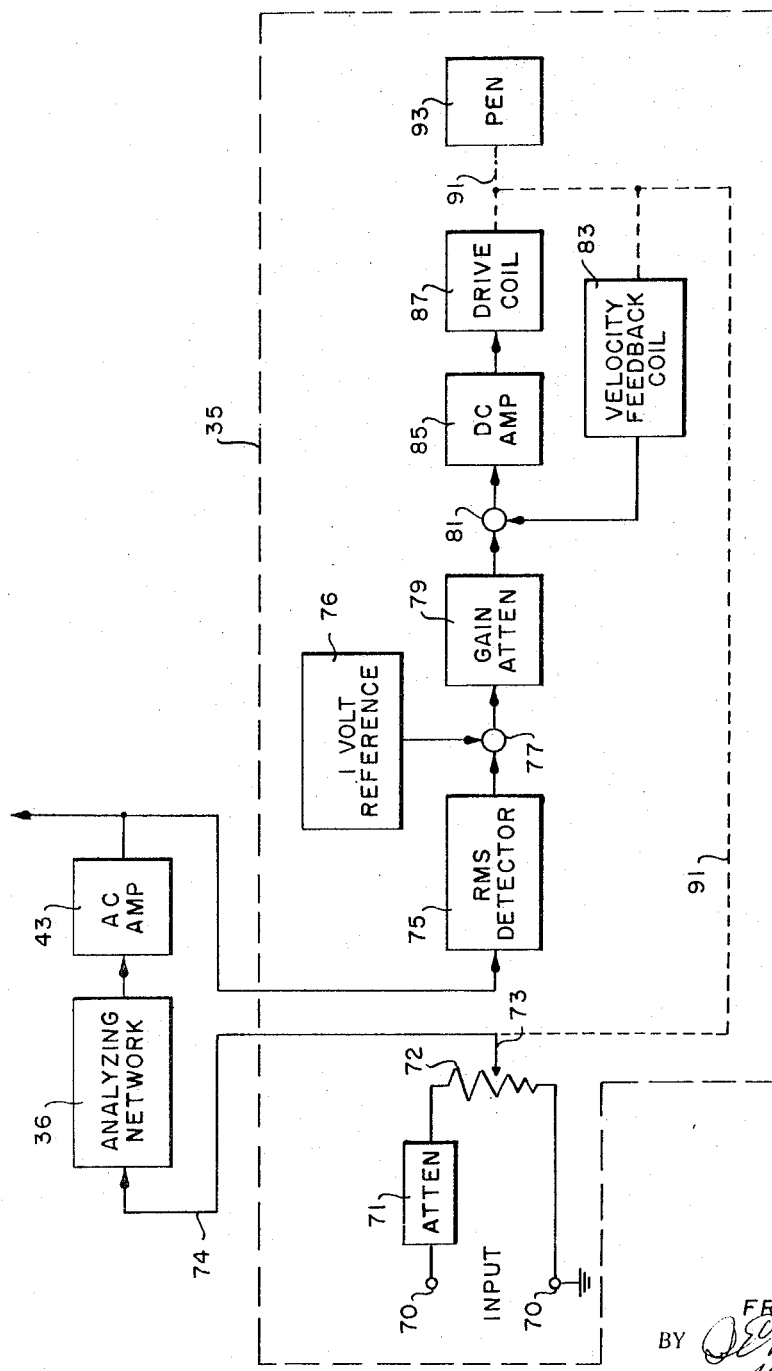
FIG. 5 is a block diagram of a graphic level recorder utilized in the preferred form of the invention.

Referring to FIG. 1a and 1b taken together, a first channel A is provided with an input terminal 11 connected to an attenuator 13, variable from zero to sixty db in twenty db steps. A second channel B is provided with an input terminal 15 connected to a second attenuator 17 variable from zero to sixty db in twenty db steps. The output of attenuator 13 is connected to a 60 db preamplifier 19. The output of attenuator 17 is connected to a preamplifier 21 which has an output connected to a voltmeter 23. A second output from amplifier 21 is connected to a cathode follower unit 25 for nulling out unwanted components of the signal in channel A. The cathode follower unit is connected through an off-on switch 26 to the preamplifier 19. The output of preamplifier 21 is connected by a switch 27 to an integrating amplifier 31 if it is desired to obtain an indication or representative of velocity from the input 15 of channel B which is indicative of acceleration. The output of the integrating amplifier 31 is connected by switch 28 to an impedance matching cathode follower 33. However, if it is desired to obtain an indication of the acceleration, or of the other signal without integration, then switches 27 and 28 are connected to a lead 29 by passing the integrating amplifier 31. The output of the impedance matching cathode follower 33 is connected by lead 34 to the input of a regulator 35 containing a recorder for recording the amplitude of the voltage and an 80 db potentiometer. A suitable regulator 35 for use in the embodiment described is illustrated in a publication "Operating Instructions Type 1521-A Graphic Level Recorder" published by General Radio Company, West Concord, Massachusetts and Copyrighted in 1961. FIG. 5 is a block diagram of the graphic level recorder which will be discussed in greater detail below.

The output of the regulator 35 is connected to the input of a 40 db amplifier which is part of the analyzing network 36. The output of the amplifier 37 is connected to the input of a 21 kc. mixer 39. The output of a sweep oscillator 40 is connected to a second input of the mixer 39. The output of mixer 39 is connected to a 21 kc. ±10 cycles per second crystal filter 41 having a band width of 20 cycles per second about 21 kc. in the embodiment described. However the values given are for the purpose of illustration and explanation and other values can be used through the system described in the specification as is well known to those skilled in the art. The output of the filter is connected to the input of amplifier 43 having two outputs. One of the outputs of amplifier 43 is connected to regulator 35 and the other output is connected to a phase computer 45. Any suitable phase computer may be used. A satisfactory phase computer for use in the embodiments described is the type 328–A transistorized phase meter described in a bulletin published by Acton Laboratories, Inc., 533 Main Street, Acton, Mass. #5M6/58–HHJ in June 1958.

The output of preamplifier 19 is connected to a second amplifier 47 which in turn has an output connected by a lead 49 to a 21 kc. mixer 50, having a second input which is connected to the input of the 21–31 kc. sweep oscillator 40. The output of the mixer 50 is connected to 21 kc. ±10 cycles per second crystal filter having a 20 cycle per second band width. The output of the crystal filter is connected to an amplifier 52 which has an output connected to the phase computer 45. A second output is of amplifier 52 is connected to a zero to 20 db control potentiometer. The output of the potentiometer is connected by lead 54 to a regulator 59 which is similar to regulator 35 but modified as described in conjunction with FIG. 5 appearing below. An output of the sweep oscillator 40 is connected by lead 55 to audio mixer 57 which has its output connected to an input of regulator 59 for controlling the amplitude of the output of the audio mixer 57. A 21 kc. crystal oscillator 58 has its output connected to the other input of the audio mixer 57. The output of the regulator 59 is connected to the input of power amplifier 61.

In order to better understand the operation of the system described in FIG. 1 a description of the regulator 59 and its modification referred to above is first presented. The regulator as sold and described by the manufacturer in the cited publication contains an attenuator 71 connected to a logarithmic potentiometer 72. The center tap arm 73 is directly connected to the input of the A.C. amplifier 43. However, in the present disclosure, the regulator 35 of FIG. 5 has a connection between the tap arm 73 severed from the A.C. amplifier 43. The analyzing network 36 has its input connected to the wiper arm 73 and its output connected to the A.C. amplifier 43. The output of the A.C. amplifier 43. The output of the A.C. amplifier 43 is connected to an R.M.S. detector 75. The A.C. amplifier 43 is provided with a second output which is connected to the input of the phase computor 45.

The output of the R.M.S. detector 75 is connected to a differential amplifier error generator 77 which compares the input signal with a one volt reference source 76. The output of the error generator 77 is connected to a gain attenuator 79 and the output of the gain attenuator 79 is connected to the first input of a second error generating differential amplifier 81. The second input of the error generating differential amplifier 81 is derived from the output of a velocity feedback coil 83 of a servo motor which is not illustrated. The output of the error generating differential amplifier 81 is connected to the input of a D.C. amplifier 85 and the output of the D.C. amplifier 85 is connected to a drive coil 87 of the servo motor. The drive shaft of the servo motor is connected by a mechanical coupling indicated as dashed line 91 to a pen 93 which records the voltage level of the incoming signal. The servo motor is connected by line 91 to control the position of the wiper arm of logarithmic potentiometer 72.

The modification of the system comprising regulator 35 required for the construction of regulator 59 is as follows: The attenuator input 70 is connected to the output of the audio mixer 57 and the wiper arm 73 of the logarithmic potentiometer is connected to the input of the power amplifier 61 of FIG. 1a. The input lead 74 of the analyzing network is connected to the output of preamplifier 19. The pen 93 may be disconnected in the embodiment of the regulator utilized in regulator 59.

Briefly the operation of FIG. 5 is as follows: The output frequency of interest appearing on wiper arm 73 is selected by analyzing network 36, and amplified in the A.C. amplifier 43 and detected by the R.M.S. detector 75. The output of the R.M.S. detector 75 is compared with one volt reference source 76 in the differential amplifier error generator 77 which generates an error signal (a difference signal which is the difference between the two input signals to the error generator 77). The generated error signal is utilized to control a servo motor which in turn controls the position of wiper arm 73 on the logarithmic potentiometer 72. The arm 73 is always moved by the servo motor which is controlled by the error signal to a position wherein the amplitude of the frequency component of the input signal which is passed by the analyzing network 36, amplified by amplifier 43 and detected by the R.M.S. detector 75 is a constant in the embodiment utilized for regulator 35. In the case of regulator 59, the signal supplied from amplifier 52 is utilized to control the output signal of the audio mixer 57, for reasons which will appear below in the discussion of the operation of FIG. 1.

Figure 4:
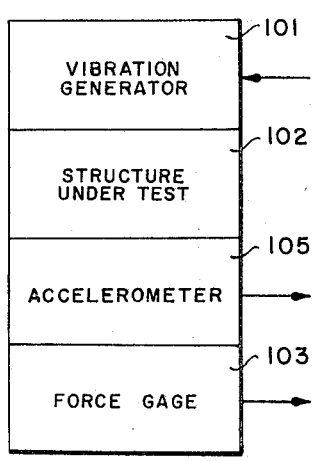
FIG. 4 is a block diagram of a suitable arrangement for generating signals by a force transducer and an acceleration transducer to be compared by the phase meter of the invention.

Turning momentarily to FIG. 4, a structure under test 102 is physically connected to a vibration generator 101. The test structure 102 is physically coupled to a force gage 103 and an accelerometer 105. The vibration generator 101 will vibrate at a frequency and amplitude determined by the amplitude and frequency of the driving voltage placed on its input. The force gage 103 will generate an output in response to the force placed on it by the test structure 102 and the accelerometer 105 will generate an output proportional to the acceleration of the test structure 102.

The operation of FIGS. 1a and 1b taken together is as follows:

Assuming that it is desired to measure the mechanical impedance of structure under test then FIGS. 1a and 4 are connected together with the power amplifier 61 connected to the vibration generator 101, the force gage 101 connected to input 11 and the output of accelerometer 105 connected to the input 15. The structure to be tested is atached to the vibration generator.

Sweep oscillator 40 generates an output signal of from 21 to 31 kc. which is mixed in audio mixer 57 with the output of 21 kc. crystal oscillator 58. Assuming for the purpose of explanation that it is desired to measure the phase relationship of the 3 kc. (3000 cycle per second) component of the signals, then sweep oscillator 40 generates a 24 kc. signal which is mixed with 21 kc. signal in the audio mixer 57. This output of the audio mixer 57 will be the difference frequency of the 24 kc. and 21 kc. signals which is 3 kc.

The audio mixer utilized in the preferred embodiment will not produce any output signal having a frequency over 10 kc. because of a filter in the output circuit and therefore the sum frequency of 21 kc. and 24 kc. being 45 kc. is automatically rejected. The regulator 59 controls the amplitude of the output of the audio mixer 57 in accordance with the amplitude of the signal placed on input of the feedback amplifier 47 as heretofore discussed in connection with FIG. 5. The output of the regulator 59 is amplified in power amplifier which in turn is fed to a vibration generator 101 illustrated in FIG. 4.

Before running a test on a structure the force gage 103 and the accelerometer 105 are vibrated in air by the vibration generator 101. The output of the accelerometer is attenuated if the signal is too large by attenuator 17 and then amplified by preamplifier 21. The output of the force gage is attenuated if the signal is too large by attenuator 13 and amplified by preamplifier 19. In the perfect system the force generator would not generate any signal due to its own mass. However, in practice force generators do generate signals when vibrated in air, due to the effects of its mass. Therefore part of the signal in the output of the amplifier 21 is fed through a feedback cathode follower 25 and added to the signal in preamplifier 19 in the proper phase relationship to cancel the entire output of preamplifier 19 when the accelerometer and force gage are vibrated by themselves. The details of the adjustment will be discussed in detail in the description of FIG. 3.

After the adjustment is made the feedback adjustment is left alone. However, if no feedback is necessary for mass compensation, then the feedback switch 26 is turned to the off position.

Now proceeding with the test, the structure under test 102, the force gage 103, and the accelerometer 105 are vibrated by the vibration generator 101. As before, the output of accelerometer 105 is attenuated, if necessary, by attenuator 17 an amplified in preamplifier 21. As described above, part of the output signal of preamplifier 21 is combined with the signal from the force generator which is attenuated, if necessary by attenuator 13, before being amplified and corrected in preamplifier 19. The output signal of the preamplifier 21 which is indicative of acceleration, is integrated by integrating amplifier 31 to give an indication of the velocity of the structure under test and then fed to an impedance matching cathode follower 33 for coupling to the input of regulator 35. Alternatively, the signal indicative of the accelerating can be fed direct to the impedance matching cathode follower for coupling to the regulator 35. The regulator 35 maintains the amplitude of the frequency (3000 cycles in the example) constant as heretofore explained in conjunction with FIG. 5. The output signal of the regulator is amplified in amplifier 37 and mixed in mixer 39 with the 24 kc. output of the sweep oscillator 40. The output of mixer 39 is the sum and difference frequency of the 3 kc. of the vibration generator and the 24 kc. generated by the sweep oscillator 40 which is 21 kc. and 27 kc. The output of mixer is fed through a 21 kc. filter having a 20 cycle per second band pass. The 21 kc. filter rejects the sum frequency of 27 kc. and passes the difference frequency of 21 kc. to the amplifier 43. The amplified 21 kc. signal is fed to the phase meter 45. The output of the preamplifier 19 is fed to amplifier 47 and mixed in mixer 50 with the output of the sweep oscillator 40. The frequency appearing on the output of mixer 50 is the same as the output of mixer 39. Band pass filter 51 passes the difference frequency of 21 kc. to amplifier 52. The amplifier 52 feeds the other input to the phase meter 45 which measures the phase difference of the output signals of amplifiers 43 and 52. The phase difference and frequency of the signal are then recorded by recorder 46. An output is taken from amplifier 52 and is attenuated if necessary by a 20 db potentiometer in order to control the output of regulator 59. The dashed line on FIG. 1b indicates a mechanical linkage. The power drive for linkage is derived from the motor provided in regulator 35, and disclosed on page 9 of the cited publication of the Type 1521-A Graphic Level Recorder. As the oscillator is tuned through its operation range of the from 21 kc. to 31 kc. by the motor the output of the audio mixer is varied from 0 to 10 kc.

The system disclosed in FIGS. 1a and 1b can be used to compare a known signal with an unknown signal by connecting the output of the power amplifier 61 which generates the known signal to the input terminal 11. The unknown signal to be compared is connected to the input terminal 15. The feedback switch 26 is turned to the off position. In addition if a differential amplifier is used as disclosed in FIG. 3 then a pair of switches 111 and 111a are employed to convert the amplifiers from having a pair of inputs to amplifiers having only one input and no feedback. The operation of the rest of the system remains the same as heretofore discussed.

Figure 2A:
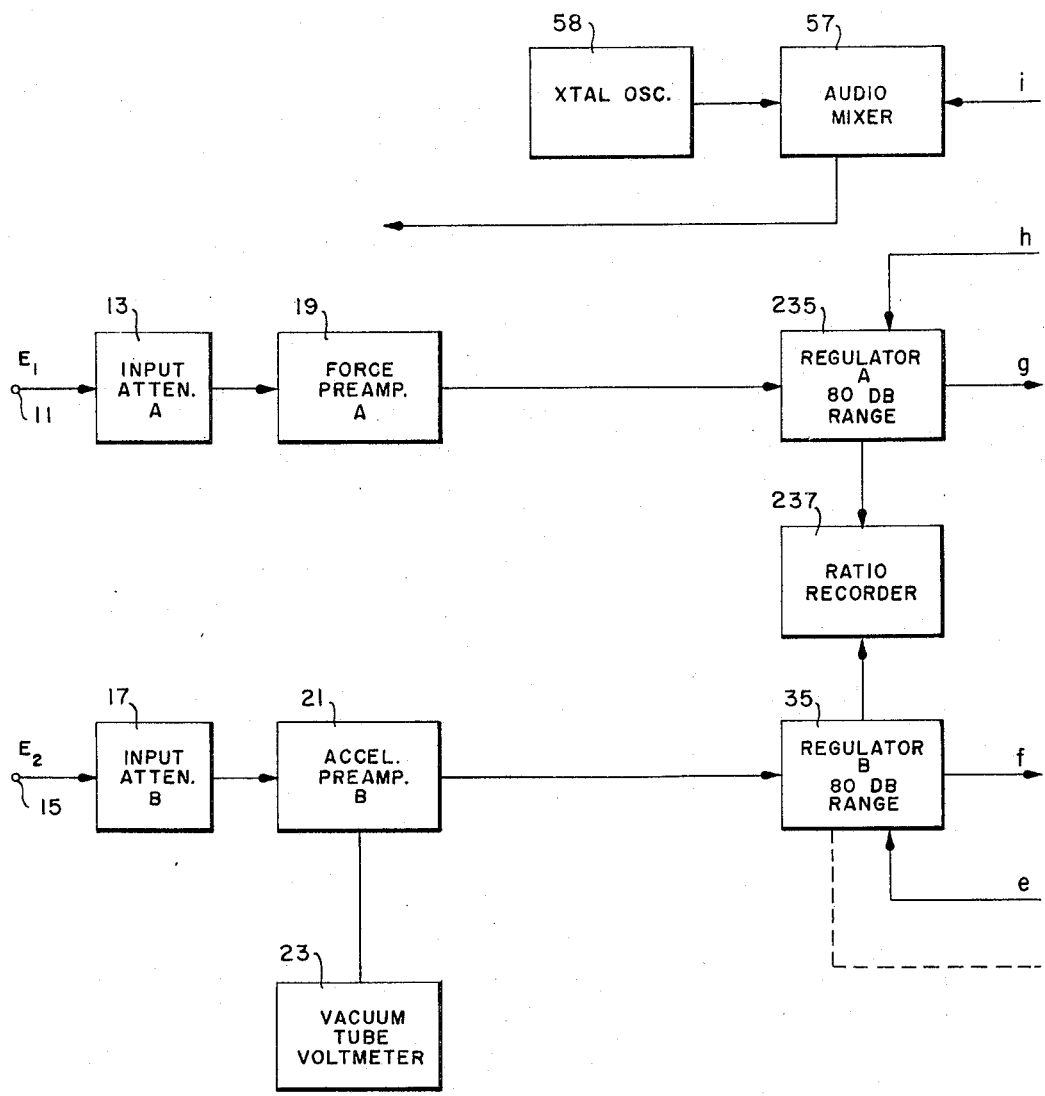
Figure 2B:
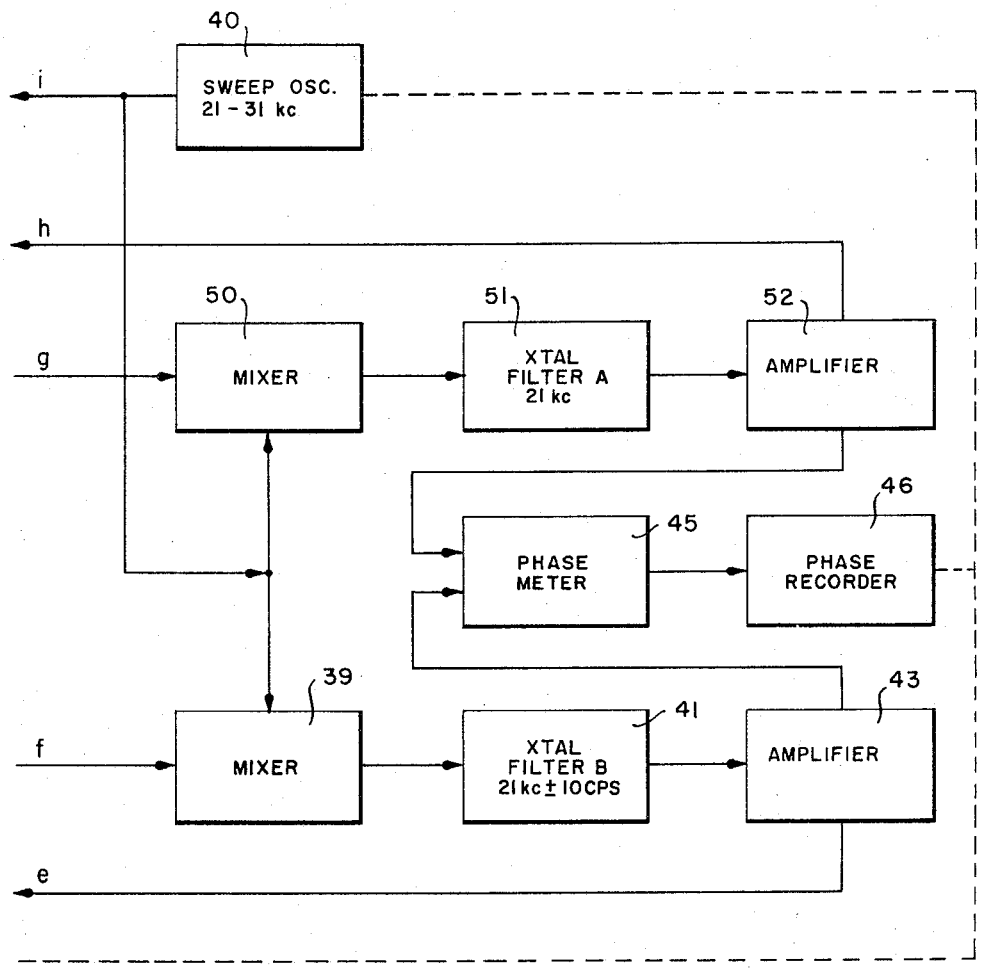

Referring to FIGS. 2a and 2b common components found in FIGS. 1a and 1b have the same numbers and operate in identical fashion as they do in FIGS. 1a and 1b and interconnected lines contain the same indicia $(e-i)$ in FIGS. 2a and 2b. The exceptions being regulator 235 having its input connected to the output of preamplifier 19 and operating in the same manner as regulator 35. The ratio recorder 237 give an indication of the ratio of the respective voltages on the ungrounded input side of the attenuator input terminals 70 of the system illustrated in FIG. 5 used as regulator 35 and on the ungrounded attenuator input terminal 70 of the system illustrated in FIG. 5 used as regulator 235.

The operation of the system illustrated in FIGS. 2a and 2b is similar to the operation of FIGS. 1a and 1b. However now two unknown voltages $E_1$ and $E_2$ may be compared by placing $E_1$ on input 11 and $E_2$ on input 15. The unknown signal may contain a plurality of frequency components within the capacity of system. The voltage signal $E_2$ is attenuated if necessary in attenuator 17, amplified by preamplifiers 21 and the frequency component of interest of $E_2$ is amplitude regulated by regulator 35. The output of oscillator 40 is mixed with all the frequencies of the input signal in mixer 39. The output of the mixer 39 is fed through a 21 kc.±10 C.P.S. filter 41 to amplifier 43. The filter 41 only passes the difference output of the mixer 39 having a bandwidth of 20 cycles per second around 21 kc. and rejects all other frequencies. The output of amplifier 43 is utilized to control the regulator 35 as heretofore explained in conjunction with FIGS. 1a, 1b, and 5. The output of the amplifier 43 is fed to phase computor 45 to compute the phase difference of the frequency of interest of the signals $E_1$ and $E_2$. Elements 13, 19, 135, 50, 51, and 52 function in identical fashion to elements 17, 21, 35, 39, 41, 43 respectively. As in FIGS. 1a and 1b a known frequency produced by audio mixer 57 as heretofore described can be substituted for $E_1$ or $E_2$.

Figure 3:
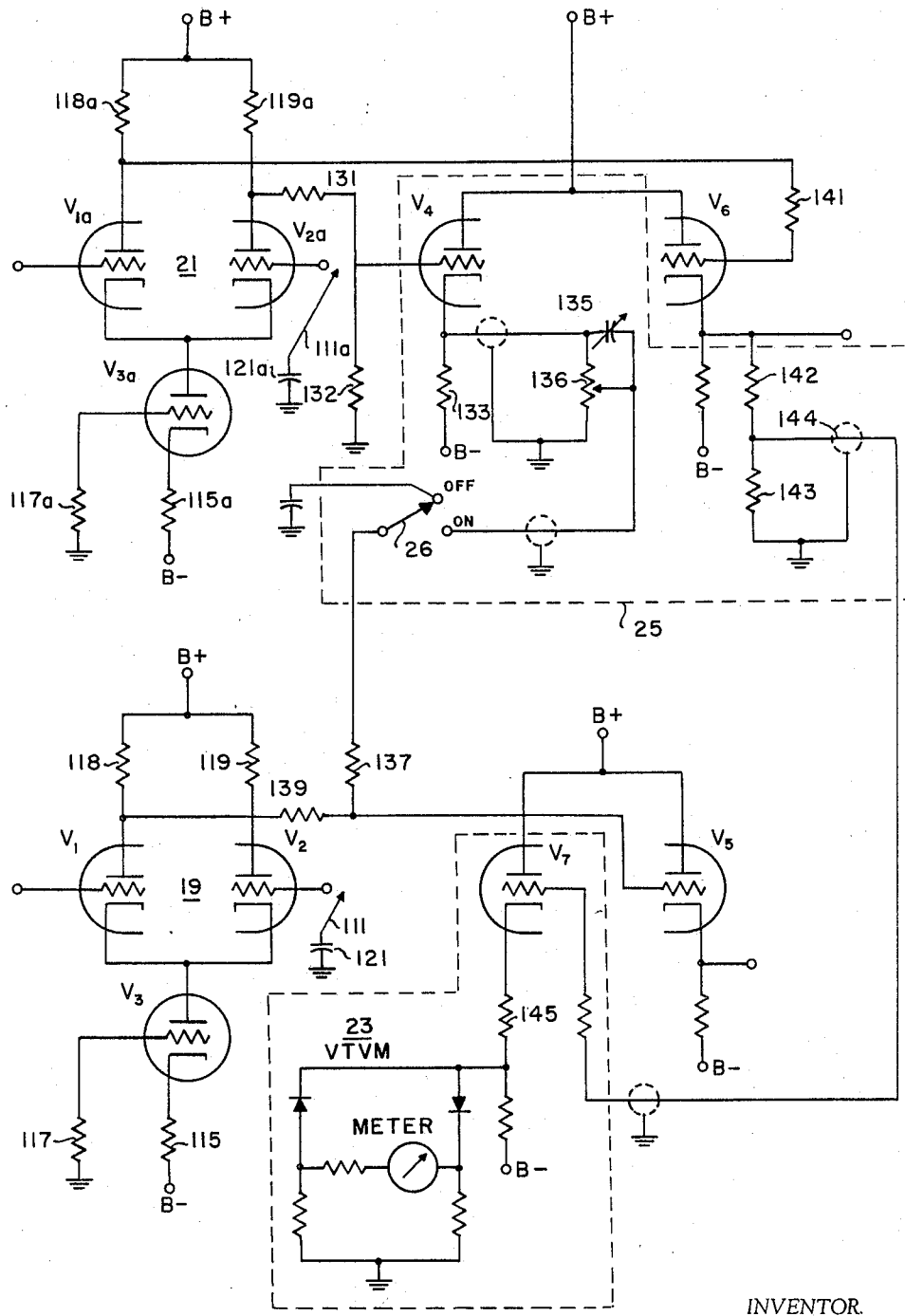
FIG. 3 is a circuit diagram of a suitable two channel interconnected amplifier which may be utilized in the preferred forms of the invention.

FIG. 3 discloses the circuits utilized for preamplifiers 19 and 21, voltmeter 23 and feedback network 25. Preamplifier 19 contains a first tube $V_1$ and second tube $V_2$ having their cathodes connected together forming a differential amplifiers. The cathode of $V_1$ and $V_2$ are connected to a source of B— potential through a bias control tube $V_3$ and bias resistor 115. The grid of tube $V_3$ is connected to ground through resistor 117. The plate of tube $V_1$ is connected to a B+ potential by resistor 118 and the plate of tube $V_2$ is connected to a B+ potential by resistor 119. The inputs to the grid of tubes $V_1$ and $V_2$ are derived from a force gage (not shown) having two outputs and a ground connection. The high voltage side of the force gage is coupled to the grid of tube $V_1$ and the low voltage side of the force gage is coupled to the grid the of tube $V_2$. In order to accommodate a force gage having only one output, a switch 111 connected through a capacitor 121 to ground is provided for connecting the grid of tube $V_2$. When only one input is present from a force gage, then the sole input is always connected to the grid of tube $V_1$ of amplifier 19.

The preamplifier 21 contains similar components which function in the identical fashion as the preamplifier 19 and therefore numbered in like fashion containing the subscript letter $a$.

A feedback cathode follower tube $V_4$ has its grid connected to the plate of the tube $V_{2a}$ through resistor 131. However, in systems employing accelerometers having a single output, an inverter tube which is not illustrated should be provided having its grid connected to the plate of tube $V_{1a}$ and having its plate connected to the input resistor 131 instead of tube $V_{2a}$. A grid bias resistor 132 connects the grid of tube $V_4$ to ground and the plate of tube $V_4$ is directly connected to the source of B+ potential. Resistor 133 connects the cathode of tube $V_4$ to the source of B— potential. A variable capacitor 135 and potentiometer 136 are provided for controlling the amount of feedback utilized for cancelling the effects of the mass of the force gage so heretofore discussed. The output of the circuit composed of variable capacitor 135 and potentiometer 136 is connected through switch 26 and resistor 137 to the grid of tube $V_5$. The plate of tube $V_1$ is connected through resistor 139 to the grid of tube $V_5$. The plate of tube $V_{1a}$ is connected through resistor 141 to the grid of cathode follower tube $V_6$. The output of the preamplifier 21 circuit is taken from the cathode of tube $V_6$. The resistors 142 and 143 are connected in series between the cathode of tube $V_6$ and ground. A lead 144 connects the junction of resistor 142 and 143 to a VTVM circuit 23 for indicating a quantity which is indicative of the voltage appearing on the cathode of tube $V_6$.

The following is a description of the operation of the circuit of FIG. 3. The frequency components of the signal generated by an accelerometer are fed to the grids of differential amplifier tubes $V_{1a}$ and $V_{2a}$. The amplified signal is then coupled through the output cathode follower tube $V_6$. Similarly the frequency components of the signal generated by the force gage are fed to the grids of tubes $V_1$ and $V_2$. Part of the signal in the amplifier 19 is subtracted from the signal in the amplifier 21 in order to eliminate the effects of the mass of the force generator as heretofore described, i.e. vibrating the force generator and accelerometer in air, putting switch 26 on the feedback position and adjusting the resistor 136 and capacitor 135 so that the signal placed on the grid of tube $V_5$ by the feedback network cancels the output signal of tube $V_1$ placed on the grid of tube $V_5$. The feedback is kept constant and is only readjusted when the force gages or the accelerometer is changed. The composite signal of the force gage and the feedback network is fed to the grid of tube $V_5$ and the composite output signal is taken from the cathode of tube $V_5$. If no feedback is necessary, switch 26 is placed on the off condition.

Obviously many modifications and variations of the present invention are possible in the light of the above teachings. It is therefore to be understood that within the scope of the appended claims the invention may be practiced otherwise than as specifically described.

What is claimed is:
1. A system for analyzing the mechanical impedance of a structure comprising:
   a force gage for producing an electrical signal;
   a first amplifier having its input coupled to said force gage;
   an accelerometer for producing an electrical signal;
   a second amplifier having its input coupled to said accelerometer;
   a first regulator means comprising a constant amplitude output voltage circuit means having an input and an output and a regulation control circuit means for controlling said constant amplitude output voltage circuit means having an input;
   a first mixer means having an output and having a pair of inputs, one of said inputs coupled to said output of said constant amplitude output voltage circuit means of said first regulator means;
   a first narrow band pass filter having an output and having its input coupled to the output of said first mixer means;
   a third amplifier having an output and having its input connected to the output of said narrow band pass filter, the output of said third amplifier being connected to the input of said regulation control circuit means;
   a second mixer means having an output and a pair of inputs, one of said inputs being coupled to the output of said first amplifier;
   a second narrow band pass filter having an output and having its input connected to the output of said second mixer;
   a fourth amplifier having an output and having its input connected to the output of said second narrow bandpass filter; and
   a phase meter having a pair of inputs, said first input of said phase meter being connected to the output of said third amplifier and said second input of said phase meter connected to the output of said fourth amplifier;
   whereby the phase angle between the output of said force gage and the output of said accelerometer for each freqeuncy component of interest is determined.

2. A system for analyzing the mechanical impedance of a structure as defined in claim 1 but further characterized by having an integrating amplifier connected between the output of said second amplifier and the input of said constant output circuit means of said first regulator means.

3. A system for analyzing the mechanical impedance of a structure as defined in claim 2 but further characterized by having an adjustable feedback means connected between said second amplifier and said first amplifier whereby the effects of the mass of said force gage are compensated.

4. A system for analyzing the mechanical impedance of a structure as defined in claim 3 but further characterized by having a sweep oscillator, said sweep oscillator having an output connected to the inputs of said first mixer and said second mixer.

5. A system for analyzing the mechanical impedance of a structure as defined in claim 4 but further characterized by having an audio mixer having a pair of inputs and an output, one of said inputs being connected to the output of said sweep oscillator:
   a second oscillator having its output connected to the other input of said audio mixer;
   a second regulator means comprising a constant amplitude output voltage circuit means having an input and an output, a regulation control circuit means having an input connected to said output of said fourth amplifier for controlling said constant output circuit means;
   said input of said constant amplitude output voltage circuit means connected to the output of said audio mixer;
   a power amplifier having an input and an output, said power amplifier input connected to said output of said constant output circuit means; and
   a vibration generation means connected to said output of said power amplifier whereby said structure under test is subject to vibrations causing said force gage and said accelerometer to generate signals indicative of the mechanical impedance of said structure.

6. A system for analyzing the mechanical impedance of a structure as defined in claim 2 but further characterized by having a sweep oscillator, said sweep oscillator having an output connected to the inputs of said first mixer and said second mixer.

7. A system for analyzing the mechanical impedance of a structure as defined in claim 6 but further characterized by having an audio mixer having a pair of inputs and an output, one of said inputs being connected to the output of said sweep oscillator;
   a second oscillator having its output connected to the other input of said audio mixer;
   a second regulator means comprising a constant amplitude output voltage circuit means having an input and an output a regulation control circuit means having an input connected to said output of said fourth amplifier for controlling said constant output circuit means;
   said input of said constant output circuit means connected to the output of said audio mixer;
   a power amplifier having an input and an output, said power amplifier input connected to said output of said constant output circuit means; and
   a vibration generation means connected to said output of said power amplifier whereby said structure under test is subject to vibrations causing said force gage and said accelerometer to generate signals indicative of the mechanical impedance of said structure.

8. A system for analyzing the mechanical impedance of a structure as defined in claim 1 but further characterized by having a sweep oscillator, said sweep oscillator having an output connected to the inputs of said mixer and said second mixed.

9. A system for analyzing the mechanical impedance of a structure as defined in claim 8 but further characterized by having an audio mixer having a pair of inputs and an output, one of said inputs being connected to the output of said sweep oscillator;
   a second oscillator having its output connected to the other input of said audio mixer;
   a second regulator means comprising a constant amplitude output voltage circuit means having an input and an output a regulation control circuit means having an input connected to said output of said fourth amplifier for controlling said constant output circuit means;
   said input of said constant output circuit means connected to the output of said audio mixer;
   a power amplifier having an input and an output, said power amplifier input connected to said output of said constant output circuit means; and
   a vibration generation means connected to said output of said power amplifier whereby said structure under test is subject to vibrations causing said force gage and said accelerometer to generate signals indicative of the mechanical impedance of said structure.

10. A system for analyzing the mechanical impedance of a structure as defined in claim 1 but further characterized by having an adjustable feedback means connected between said second amplifier and said first amplifier whereby the effects of the mass of said force gage are compensated.

11. A highly accurate phase meter for measuring the phase angle of frequency components between a first signal and a second signal comprising:
- a first amplifier means having an input adapted to receive a first signal and having an output;
- a first regular means comprising a constant amplitude output voltage circuit means having an input and an output, a regulation control circuit means for controlling said constant output circuit means, having an input, said input of said constant output circuit being coupled to said output of said first amplifier;
- a first mixer means having a pair of inputs and an output;
- one of said inputs of said first mixer connected to the output of said constant output circuit means of said first regulator means;
- a first narrow pass band filter having an input and an output, said input of said narrow pass band filter connected to the output of said first mixer;
- a second amplifier means having an input and a pair of outputs, said second amplifier means input connected to the output of said narrow pass band filter one of said outputs of said second amplifier means connetced to said input of said regulation control circuit means of said first regulator maens for deriving a control signal;
- a third amplifier means having an input adapted to receive a second signal and an output;
- a second regulator means having a constant amplitude output voltage circuit means having an input and an output, and a regulation control circuit means for controlling said constant output circuit means having an input, said input of said constant output circuit is coupled to said output of said second amplifier;
- a second mixer means having a pair of inputs and an output;
- one of said inputs of said second mixer connected to the output of said constant output circuit means of said second regulator means;
- a first narrow pass band filter having an input and an output, said input of said narrow pass band filter connected to the output of said second mixer;
- a fourth amplifier means having an input and a pair of outputs, said fourth amplifier means input connected to the output of said narrow pass band filter one of said outputs of said fourth amplifier means connected to said input of said regulation control circuit means of said second regulation means for deriving a control signal;
- a phase meter having a pair of inputs, one of said phase meter inputs connected to an output of said second amplifier means and the other phase meter input connected to an output of said fourth amplifier means; and
- a variable sweep oscillator having its output connected to the other inputs of said first and said second mixers whereby the phase angles of the frequency components of a pair of signals are measured.

12. A highly accurate phase meter for measuring the phase angle of frequency components between a first signal and a second signal as defined in claim 11 but further characterized by having a ratio recorder connected between the respective inputs of said constant output circuit means of said first and second regulator means.

13. A highly accurate phase meter for measuring the phase angle of frequency components between a first signal and a second signal as defined in claim 12 but further characterized by having:
- an audio mixer means having a pair of inputs and an output, one of said audio mixer inputs connected to said sweep oscillator output; and
- a second oscillator having its output connected to the other input of said audio mixer whereby said audio mixer generates a signal;
- said audio mixer output connected to the input of said first amplifier whereby said first signal is a known generated signal and is to be compared with an unknown signal placed on the input of said third amplifier.

14. A highly accurate phase meter for measuring the phase angle of frequency components between a first signal and a second signal as defined in claim 11 but further characterized by having:
- an audio mixer means having a pair of inputs and output, one of said audio mixer inputs connected to said sweep oscillator output; and
- a second oscillator having its output connected to the other input of said audio mixer whereby said audio mixer generates a signal;
- said audio mixer output connected to the input of said first amplifier whereby said first signal is a known generated signal and is to be compared with an unknown signal placed on the input of said third amplifier.

15. A highly accurate phase meter for measuring the phase angle of frequency components between a first signal and a second signal comprising:
- a first regulator means comprising a constant amplitude output voltage circuit means having an input and an output and a regulation control circuit means for controlling said constant output circuit means having an input;
- a first mixer means having an output and a pair of inputs, one of said inputs coupled to said output of said constant output circuit means of said first regulator means;
- a first narrow band pass filter having an output, an input and having its input coupled to the output of said first mixer means;
- said output of said narrow band filter connected to said input of said regulation control circuit;
- a second mixer means having an output and a pair of inputs, an input signal connected to one of said inputs of said second mixer, a second input signal being connected to said input of said constant amplitude output voltage circuit means;
- a second narrow band pass filter having an output and having its input connected to the output of said second mixer;
- a variable sweep oscillator having its output connected to the other input of said first and the other input of said second mixers; and
- a phase meter having a pair of inputs, said first input of said phase meter being connected to the output of said first narrow band pass filter and said second input of said phase meter being connected to the output of said second narrow band pass filter whereby the phase angle of the input signals is measured.

16. A highly accurate phase meter for measuring the phase angle of frequency components between a first signal and a second signal comprising:
- a first regulator means comprising a constant amplitude output voltage circuit means having an input and an output, a regulation control circuit means for controlling said constant output circuit means having an input;
- a first mixer means having a pair of inputs and an output, one of said inputs of said first mixer means connected to the output of said constant output circuit means of said first regulator means;
- a first narrow pass band filter having an input and output, said input of said narrow pass band filter connected to the output of said first mixer, said first narrow pass band filter output connected to said input of said regulation control circuit means of said first regulator means deriving a control signal;
- a second regulator means comprising a constant amplitude output voltage circuit means having an input and an output, a regulation control circuit means for controlling said constant output circuit means having an input;

a second mixer means having a pair of inputs and an output, one of said inputs of said first mixer means connected to the output of said constant output circuit means of said first regulator means;

a second narrow pass band filter having an input and an output, said input of said narrow pass band filter connected to the output of said second mixer, said second narrow pass band filter output connected to said input of said regulation control circuit means of said second regulator means deriving a control signal;

a phase meter having a pair of inputs, one of said phase meter inputs connected to said output of said first narrow pass band filter and the other phase meter input connected to said output of said second narrow pass band filter; and a variable sweep oscillator having its output connected to the other input of said first and said second mixers, whereby the phase angles of the frequency components of first signal being coupled to said input of said first regulator means constant amplitude output voltage circuit means and a second signal being coupled to said input of said second regulator means constant amplitude output voltage circuit means are measured.

References Cited by the Examiner
UNITED STATES PATENTS

| | | | |
|---|---|---|---|
| 2,561,182 | 7/1951 | Crane | 324—79 X |
| 2,851,658 | 9/1958 | Howson | 324—83 X |
| 3,018,439 | 1/1962 | Burrow | 324—79 X |
| 3,070,996 | 1/1963 | Schloss et al. | 73—67.1 |
| 3,087,111 | 4/1963 | Lehan et al. | 324—140 X |
| 3,182,256 | 5/1965 | Andrew | 324—79 |
| 3,191,431 | 6/1965 | Schloss | 324—83 X |

WALTER L. CARLSON, *Primary Examiner.*

P. F. WILLE, *Assistant Examiner.*